United States Patent Office 3,146,086
Patented Aug. 25, 1964

3,146,086
HERBICIDAL AND PESTICIDAL HALOGENATED TEREPHTHALALDEHYDE COMPOSITIONS
Henry Bluestone, University Heights, Ohio, and Fred W. Rowland, Brooklyn, N.Y., assignors to Diamond Alkali Company, Cleveland, Ohio, a corporation of Delaware
No Drawing. Filed July 1, 1960, Ser. No. 40,162
25 Claims. (Cl. 71—2.3)

This invention relates to biologically active compositions comprising as active ingredients halogenated phthalaldehydes.

More particularly, the present invention relates to the use as pesticidies of compositions embodying a pesticidal amount of a halodialdehyde compound having the following structure:

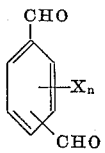

wherein X is halogen, i.e., chlorine, fluorine, bromine, iodine, or mixtures thereof, chlorine being preferred, and $n$ is a number from 1 to 4, inclusive.

As used in the specification and claims, the terms "pesticide" and "pesticidal" are intended to refer to the killing and/or controlling the growth of plants, e.g., weeds; insects; nematodes; microorganisms; fungi; or the like. Thus, it will be appreciated that applications commonly termed herbicidal, nematocidal, insecticidal, fungicidal, or the like, are contemplated.

Illustrative of specific and presently preferred phthalaldehydes as pesticides of this invention as active pesticidal ingredients are the following chloroterephthalaldehydes:

2,3,5,6-tetrachloroterephthalaldehyde

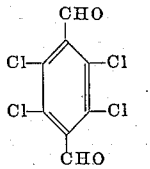

2,3,5-trichloroterephthalaldehyde

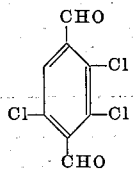

2,5-dichlorotereptthalaldehyde

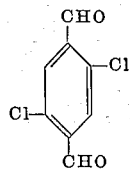

2-chloroterephthalaldehyde

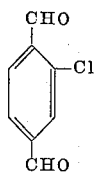

Compositions of this invention are characterized by their ability to inhibit growth of broad-leaved plants without injuring the other existing foliage.

The compounds of this invention can generally be prepared by hydrolysis of corresponding bis(dihalomethyl)-halo benzenes, e.g., tetrachloroterephthalaldehyde can be prepared by heating alpha,alpha,alpha',alpha',2,3,5,6-octachloro-p-xylene with sulfuric acid, pouring the mixture onto ice and recrystallizing the desired tetrachloroterephthalaldehyde from a solvent such as carbon tetrachloride. Similarly, 2,3,5-trichloroterephthalaldehyde can be prepared by heating alpha,alpha,alpha',alpha', 2,3,5-heptachloro-p-xylene with sulfuric acid, e.g., at 90° to 95° C. until no more HCl is liberated and then recrystallizing the product from a solvent such as heptane.

In using the halodialdehydes of this invention as pesticides, e.g., fungicides, they can be applied as such or they can be extended with a liquid or solid diluent. The compounds of this invention can, for example, be combined or formulated into suitable compositions for spraying or drenching or, if desired, formulated as an emulsifiable concentrate. Alternatively, the compounds can, of course, be formulated into appropriate use compositions by mixing a toxic amount thereof with a conditioning agent of the kind used and referred to in the art of the pest control adjuvant.

Pesticidal compositions embodying the invention can be prepared in the form of solids or liquids. Solid compositions, preferably in the form of wettable powders, are compounded to give homogeneous free-flowing powder by mixing the active ingredient with finely divided solids, Attaclays, diatomaceous earth, synthetic fine silica or flours, such as walnut shell, redwood, soybean, cotton seed flour or other solid conditioning agents or carriers of the kind conventionally employed in preparing pest control compositions in solid or liquid form.

Even more preferable among solid compositions, in some instances, are granules or pellets when the application is primarily to the soil. Granules may be prepared by impregnating granular diluents such as granular Attaclay or may be made by first extending powdered solid with powdered diluent and subsequently granulating. Pellets are made by extruding moistened, powdered mixtures under high pressure through dies.

Liquid compositions of the invention can be prepared by mixing the active ingredient with a suitable liquid diluent medium. The resulting composition can be in the form of either a solution or suspension of the active ingredient.

The pesticidal compositions of the invention, whether in the form of solids or liquids, for most applications may also include a surface-active agent of the kind sometimes referred to in the art as a wetting, dispersing or emulsifying agent. These agents, which will be referred to hereinafter more simply as surface-active agents, cause the compositions to be easily dispersed in water to give aqueous sprays.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," vol. 31, Nos. 7–10 (1955), including, for example, the material known as Triton X–155 (100% alkylaryl pollyether alcohol—U.S. Patent No. 2,504,064).

Generally, the surface-active agent will not comprise more than about 5% to 15% by weight of the composition depending, of course, upon the particular surface-active agent, the system in which it is placed, and the result desired; in certain compositions, the precentage will be 1% or less. Usually, the minimum lower concentration will be 0.1%.

The active compound is, of course, applied in an amount sufficient to exert the desired pesticidal action. The amount of the active ingredient present in the compositions as actually applied will vary with the manner of application, the particular pest for which control is sought, the purposes for which the application is being made, and like variables. In general, however, the pesticidal compositions, e.g., fungicidal compositions, will contain from about 0.5% to 85% by weight of the active ingredient.

Fertilizer materials, herbicidal agents, and other pest control agents such as insecticides and fungicides can be included in the compositions of the invention if desired.

In order that those skilled in the art may more completely understand the present invention and the preferred methods by which the same may be carried into effect, the following specific examples are offered:

EXAMPLE I

*2,3,5,6-Tetrachloroterephthalaldehyde*

Alpha,alpha,alpha′,alpha′,2,3,5,6 - octachloro - p-xylene (90 g., 0.23 mole) is reacted with 800 g. of 98% sulfuric acid and the mixture heated for 6 hours at 130°–140° C. The mixture is cooled, poured into ice and a light yellow solid settles out of the solution. The solid is filtered, washed with water, and dried. This material is recrystallized from methylethyl ketone to give 50 g. (78%) of a solid melting at 190°–191° C. The elemental analysis checks for the desired 2,3,5,6-tetrachloroterephthaldehyde.

| Element | Percent Calculated | Percent Actual |
|---|---|---|
| C | 35.4 | 34.8 |
| H | 0.7 | 0.9 |

Examples II to VII, inclusive, illustrate the use of 2,3,5,6-tetrachloroterephthalaldehyde.

EXAMPLE II

A tomato foliage disease test is conducted measuring the ability of 2,3,5,6-tetrachloroterephthalaldehyde to protect tomato foliage against infection by the early blight fungus *Alternaria solani*. Tomato plants 5 to 7 inches high of the variety Bonny Best are employed. The plants are sprayed with 100 ml. of test formulation, one each at 2000 p.p.m. and 400 p.p.m. product of Example I in combination with 5% acetone-0.01% Triton X–155, balance water, at 40 lbs. air pressure while being rotated on a turntable in a spray chamber. After the spray deposit is dry, the treated plants and comparable untreated controls are sprayed with a spore suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. Data based on the number of lesions obtained on the control plants shows 100% and 53% disease control, respectively.

EXAMPLE III

Fungicidal utility is demonstrated by the ability of 2,3,5,6-tetrachloroterephthalaldehyde to protect tomato plants against the late blight fungus, *Phytophthora infestans*, using the procedure of Example II. After the spray deposit is dry, the treated plants and comparable untreated controls are sprayed with approximately 150,000 sporangia of *P. infestans* per ml. The plants are held in a saturated atmosphere for 24 hours at 60° F. to permit spore germination and infection. After 2 to 4 days, lesion counts are made on the three uppermost fully expanded leaves. Comparing the number of lesions on the test plants and control plants shows disease control of 100% and 94% at 2000 p.p.m. and 400 p.p.m., respectively.

EXAMPLE IV

To evaluate bactericidal activity, the product of Example I is mixed with distilled water containing acetone and Triton X–155, at a concentration of 250 p.p.m. 5 ml. of the test formulation are put in each of four test tubes. To each test tube is added one of the organisms: (0.5 ml. bacterial suspension is added to 4.5 ml. of test formulation to obtain a final concentration of 250 p.p.m. of 2,3, 5,6 - tetrachloroterephthalaldehyde) *Erwinia amylovora*, *Xanthomonas phaseoli*, *Staphylococcus aureus* and *Escherichia coli* in the form of a bacterial suspension in distilled water and prepared from 24 hr. culture slants. The tubes are then incubated for 4 hours at room temperature. Transfers are then made to sterile broth with a standard 4 mm. loop and the thus inoculated broth is incubated for 48 hours at 29° to 31° C. when growth is rated by turbimetric measurement. Using this procedure, growth ratings of 32%, 30%, 18%, and 36%, respectively, are obtained, in comparison to controls in which growth ratings of 80%, 84%, 70%, and 80%, respectively, are obtained.

EXAMPLE V

To test phytotoxic effects, tomato plants, variety Bonny Best, 5″ to 7″ tall; corn, variety Cornell M–1 (field corn), 4″ to 6″ tall; bean, variety Tendergreen, before the trifoliate leaves are beginning to unfold; and oats, variety Clinton, 3″ to 5″ tall, are sprayed with an aqueous test formulation (0.48% product of Example I, 12.5% cyclohexanone, 0.01% Triton X–155, balance water). The plants are sprayed with 80 ml. at 40 lbs. air pressure while being rotated on a turntable in a spray hood. Records are taken 14 days after treatment and phytotoxicity is rated on a scale from 0 for no injury to foliage to 11 for plant kill. Using this procedure, results indicate no foliage injury on the bean and corn plants, formative effects on the tomato and bean plants and severe stunting of the beans at concentrations of 4800, 2400, and 1200 p.p.m. No effects on the corn and oats are seen.

EXAMPLE VI

At concentrations of 600, 300, and 150 p.p.m., it is observed that axillary growth in cotton (in terms of fresh weight of growth per axil expressed as percent of check weight) is only 18, 57, and 6, respectively, using 80 ml. of an aqueous test formulation containing 10% acetone and 0.00025 percent Triton X–155 sprayed on 68-day old cotton plants containing 8 to 10 axils per plant. In this procedure, just prior to spraying, the terminal bud of each cotton plant is excised to stimulate axillary growth.

EXAMPLE VII

Further to illustrate the effects of 2,3,5,6-tetrachloro-terephthalaldehyde as a plant growth regulant plots (5' x 20') are laid out and in separate rows squash, cucumbers, soy beans, Lima beans, turnips and cotton are planted. 37 days after planting, the test compound (in an 11% cyclohexanone solutions at 80 gallons per acre—7.5 lbs./acre of test chemical is applied). 77 days after planting (40 days after treatment) the squash, cucumber, soybeans and turnip are harvested; the Lima beans and cotton are harvested 11 days later. The results, indexed comparatively, are as follows:

| Crop and Days After Treatment | Plant Response | | | Check | | |
|---|---|---|---|---|---|---|
| | No. of Plants | Grams/ Plot | Grams/ Plant | No. of Plants | Grams/ Plot | Grams/ Plant |
| Squash | 40 | 14 | 2,060 | 147 | 15 | 1,541 | 103 |
| Cucumber | 40 | 25 | 880 | 35 | 34 | 3,883 | 116 |
| Soybean | 40 | 24 | 1,260 | 53 | 24 | 2,500 | 104 |
| Lima Bean | 51 | 11 | 275 | 25 | 13 | 613 | 47 |
| Turnip | 40 | 65 | 7,535 | 116 | 61 | 5,010 | 82 |
| Cotton | 51 | 6 | 9 | 1.5 | 12 | 291 | 24 |

As the foregoing data indicate growth inhibiting action of 2,3,5,6-tetrachloroterephalaldehyde is shown on several plants, especially cotton.

EXAMPLE VIII

2,3,5-Trichloroterephthalaldehyde

Alpha,alpha,alpha',alpha'2,3,5 - heptachloro - p - xylene (70 g., 0.2 mole) is dissolved in 400 ml. of concentrated (98%) sulfuric acid. The mixture is heated to 90° C. and dry nitrogen gas bubbled into the solution to remove the hydrogen chloride gas as it is formed. After all the hydrogen chloride gas has been swept out of the solution, the mixture is poured into ice. A yellow solid settles out of the aqueous solution; the solid is washed with water and dried. This material, upon being recrystallized several times from heptane, gives 24 g. (50%) of a yellow solid melting at 86°–87° C. The elemental analysis checks for the desired 2,3,5-trichloroterephthalaldehyde.

| Element | Percent Calculated | Percent Actual |
|---|---|---|
| C | 40.5 | 40.1 |
| H | 1.27 | 1.51 |

EXAMPLE IX

To indicate soil fungicide activity, sterile soil is infested with *Rhizoctonia solani* grown on a cornmeal sand medium. In order to obtain the desired inoculum potential in the test, the contents of two 250 ml. flasks containing a 10-day old culture of the fungus are mixed per level flat of sterile soil. The infested soil is then placed in small Dixie cups (4 oz. squat). Treatment of the soil is accomplished by drenching 25 ml. of a test formulation on the surface of the soil in duplicate cups. The test formulation is prepared by weighing or measuring the appropriate amount of test compound adding acetone, then emulsifier and bringing to volume with distilled water. The final concentrations are 4% acetone and 0.01% Triton X-155 by volume. The amount of test chemical is equivalent to 64 to 32 lbs./acre. The surface area of the soil in the cups is 5.73 square inches so that it requires 0.414 mg. of test chemical per cup to achieve a rate of 1 lb./acre. After drenching, the cups are placed in a saturated atmosphere at 70° F. for 48 hours. At the end of this time, the fungus mycellum has completely overgrown the surface of the soil in the control cups. The effectiveness of the test chemical is determined by observing the cups and grading them on a scale from 0=complete inhibition of growth to 10=growth equivalent to that of the control. These grades are then expressed as percent control, 0% indicating no activity and 100% indicating complete inhibition of mycelial growth over the soil surface. Using this procedure, at a rate of 64 and 32 lbs./acre, 2,3,5-trichloroterephthalaldehyde exhibits 100% and 80% control, respectively.

EXAMPLE X

Using the procedure of Example IV, the data are: at 100 p.p.m., *E. amylovora*, 100%; *X. phaseoli*, 100%; *E. aureus*, 100%; and *E. coli*, 20% growth inhibition.

EXAMPLE XI

Using the procedure of Example V, a zero phytotoxicity rating is observed on both tomato and bean plants at 0.48% with severe stunting of the bean plants and some formative effects on both plants.

EXAMPLE XII

2,5-Dichloroterephthalaldehyde

Alpha,alpha,alpha',alpha' - tetrabromo - 2,5 - dichloro-p-xylene (17 g. 0.034 mole) is heated with 300 g. of concentrated sulfuric acid (98%) at 120°–130° C. for 3 hours. After all the hydrogen bromide has been liberated, the solution is cooled, poured into 500 g. of ice. A yellow solid (8 g.), is isolated which, when recrystallized from xylene, gives 5 g. (72%) of a solid melting at 160° C. This material gives a positive 2,4-dinitrophenyl hydrazone test and the melting point checks with that given in the literature for 2,5-dichloroterephthalaldehyde.

To illustrate the use of 2,5-dichloroterephthalaldehyde the following examples are provided.

EXAMPLE XIII

Using the procedure of Example IV, 2,5-dichloroterephthalaldehyde produces a 100% control of *Xanthomonas phaseoli* at a concentration of 250 p.p.m.

EXAMPLE XIV

Using the procedure of Example III, 2,5-dichloroterephthalaldehyde produces a 100% control of Late blight fungus at a concentration of 1000 p.p.m., and a 74% control at a concentration of 200 p.p.m. Via the procedure of Example II, at a concentration of 1000 p.p.m., a 50% control of Early blight fungus is observed.

EXAMPLE XV

Using 2,5-dichloroterephthalaldehyde with the procedure of Example IX, but at a concentration of 64 lbs./acre, 80% control is observed.

EXAMPLE XVI

2-Chloroterephthalaldehyde 2-chloro-p-xylene a,a'-diol (55.2 g., 0.32 mole) is reacted with 600 ml. of 12.6% nitric acid. When the temperature reaches 90° C., a vigorous evolution of oxides of nitrogen is observed. The solution is then refluxed for an additional 7 hours. Upon cooling overnight, pale yellow crystals separate out of the solution. The solid is filtered, dried, and recrystallized from n-hexane. There is isolated 23 g. (43%) of a material melting at 75°–76° C., and having an elemental analysis checking for the desired 2-chloroterephthalaldehyde.

| Element | Percent Calculated | Percent Actual |
|---|---|---|
| C | 56.99 | 56.8 |
| H | 2.98 | 2.7 |

EXAMPLE XVII

Using the procedure of Example IX, 2-chloroterephthalaldehyde produces an 80% control at 128 lbs./acre.

EXAMPLE XVIII

Using the procedure of Example IV, 2-chloroterephthalaldehyde produces a 100% control of *Xanthomonas phaseoli* at 250 p.p.m.

It is to be understood that although the invention has been described with specific reference to particular embodiments thereof, it is not to be so limited, since changes and alterations therein may be made which are within the full intended scope of this invention as defined by the appended claims.

What is claimed is:

1. A pesticidal composition comprising 0.1% to 15% by weight of a surface active agent, 0.5% to 85% by weight of a halogenated aldehyde having the formula 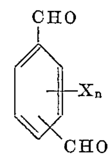 wherein X is halogen and $n$ is a number from 1 to 4, inclusive and the balance a carrier.

2. The composition according to claim 1 wherein $n$ is 4 and X is chlorine.

3. The composition according to claim 1 wherein $n$ is 3 and X is chlorine.

4. The composition according to claim 1 wherein $n$ is 2 and X is chlorine.

5. The composition according to claim 1 wherein $n$ is 1 and X is chlorine.

6. The composition according to claim 1 wherein the compound is 2,3,5,6-tetrachloroterephthalaldehyde.

7. The composition according to claim 1 wherein the compound is 2,3,5-trichloroterephthalaldehyde.

8. The composition according to claim 1 wherein the compound is 2,5-dichloroterephthalaldehyde.

9. The method of inhibiting axillary growth in plants which comprises applying thereto a composition according to claim 1.

10. The method of killing pests which comprises contacting said pests with a pesticidal amount of a halogenated aldehyde having the formula 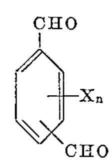 wherein X is halogen and $n$ is a number from 1 to 4, inclusive.

11. The method according to claim 10 wherein the compound is 2,3,5,6-tetrachloroterephthalaldehyde.

12. The method according to claim 10 wherein the compound is 2,3,5-trichloroterephthalaldehyde.

13. The method according to claim 10 wherein the compound is 2,5-dichloroterephthalaldehyde.

14. The method of killing fungi which comprises contacting said fungi with a fungicidal amount of 2,3,5,6-tetrachloroterephthalaldehyde.

15. The method according to claim 14 wherein the compound is applied to plant foliage.

16. The method of killing fungi which comprises contacting said fungi with a fungicidal amount of 2,3,5-trichloroterephthalaldehyde.

17. The method according to claim 16 wherein the compound is applied to plant foliage.

18. The method of killing fungi which comprises contacting said fungi with a fungicidal amount of 2,5-dichloroterephthalaldehyde.

19. The method according to claim 18 wherein the compound is applied to plant foliage.

20. The method of killing fungi which comprises contacting said fungi with a fungicidal amount of 2-chloroterephthalaldehyde.

21. The method according to claim 20 wherein the compound is applied to plant foliage.

22. The method of killing bacteria which comprises contacting said bacteria with a bactericidal amount of 2,3,5,6-tetrachloroterephthalaldehyde.

23. The method of killing bacteria which comprises contacting said bacteria with a bactericidal amount of 2,3,5-trichloroterephthalaldehyde.

24. The method of killing bacteria which comprises contacting said bacteria with bactericidal amount of 2,5-dichloroterephthalaldehyde.

25. The method of inhibiting plant growth which comprises applying to the plant a herbicidal amount of 2,3,5,6-tetrachloroterephthalaldehyde.

References Cited in the file of this patent

UNITED STATES PATENTS

| | | |
|---|---|---|
| 2,010,841 | Bender | Aug. 13, 1935 |
| 2,180,772 | Scherer | Nov. 21, 1939 |
| 2,989,535 | Geeren et al. | June 20, 1961 |

OTHER REFERENCES

Chemical Abstracts: vol. 38, page 62884 (1944); vol. 47, page 8040h (1953); vol. 47, page 12510a (1953).

Chem. Abstracts, vol. 52, 1958, pp. 5470g and 12799e.